(12) United States Patent
Mizuno et al.

(10) Patent No.: US 6,700,114 B2
(45) Date of Patent: Mar. 2, 2004

(54) APPARATUS FOR DETECTING RECIPROCATING MOTION OF OBJECT AND/OR AMPLITUDE THEREOF

(75) Inventors: Tamotsu Mizuno, Aichi-ken (JP); Takamoto Watanabe, Nagoya (JP); Katsuji Kosaka, Anjo (JP); Yoshiaki Hoashi, Kariya (JP)

(73) Assignee: Denso Corporation, Kariya (JP)

( * ) Notice: Subject to any disclaimer, the term of this patent is extended or adjusted under 35 U.S.C. 154(b) by 54 days.

(21) Appl. No.: 10/150,073

(22) Filed: May 20, 2002

(65) Prior Publication Data

US 2002/0175277 A1 Nov. 28, 2002

(30) Foreign Application Priority Data

May 24, 2001 (JP) ........................ 2001-155699

(51) Int. Cl.[7] .............................. H01J 3/14; G02B 26/08
(52) U.S. Cl. ................. 250/234; 250/214 R; 359/212

(58) Field of Search ................................. 250/234, 235, 250/236, 214 R, 206.1; 359/197, 212, 213, 223, 224

(56) References Cited

U.S. PATENT DOCUMENTS 5,187,364 A * 2/1993 Blais ........................ 250/236
6,069,725 A * 5/2000 Melville ..................... 359/212

\* cited by examiner

*Primary Examiner*—Kevin Pyo
(74) *Attorney, Agent, or Firm*—Posz & Bethard, PLC

(57) ABSTRACT

A system working to detect a reciprocating motion of an object such as a scanner mirror of an optical scanner. The system is designed to compensate for an error which is concluded in an amplified sensor signal used to determine a reference position of the scanner mirror and which is sensitive to a change in environmental condition of use such as a change in ambient temperature. The system also works to monitor a change in amplitude of swing of the scanner mirror accurately to keep it constant.

11 Claims, 10 Drawing Sheets

APPARATUS FOR DETECTING RECIPROCATING MOTION OF OBJECT AND/OR AMPLITUDE THEREOF

BACKGROUND OF THE INVENTION

1. Technical Field of the Invention

The present invention relates generally to an apparatus designed to detect a reciprocating motion of an object and/or an amplitude of the reciprocating motion accurately.

2. Background Art

Optical scanners are employed in barcode readers, laser printers, laser radars, etc. which are constructed to sweep a laser beam across a target in one-dimensional direction. As one of this type of optical scanners, an oscillating scanner is known which is designed to achieve the sweeping of a laser beam mechanically by emitting the laser beam to a reflective mirror installed on an oscillating member of the scanner.

The oscillating scanner is required to monitor the orientation of the reflective mirror or the oscillating member in order to determine the time the laser beam is to be emitted to the reflective mirror. As one of methods of determining the orientation of the reflective mirror, a position monitor system has been proposed which uses a permanent magnet and a magnetic sensor made of a pickup coil. The permanent magnet is installed on the oscillating member of the scanner. The magnetic sensor is opposed to a given location defined on a path of swing of the permanent magnet. The magnetic sensor produces an output as a function of an intensity of magnetic field produced therearound for use in determining the time the magnet passes the given location.

In a case where the magnetic sensor is opposed to the center of the path of swing of the magnet, the intensity of the magnetic field generated near the magnetic sensor is maximized when the magnet is at the center of the swing path, while it is minimized when the magnet is at ends of the swing path. At these locations, a rate of a change in magnetic field intensity or the output of the magnetic sensor becomes zero (0). The output of the magnetic sensor differs in polarity between when the magnet is approaching the magnetic sensor and when the magnet is leaving the magnetic sensor. Thus, if the output of the magnetic sensor is defined as being positive when the magnet is approaching the magnetic sensor, when the output of the magnetic sensor is changed from positive to negative, a reference position signal may be produced as indicating the time when the magnetic passes through the center of the swing path.

The output of such a type of magnetic sensor is usually weak in level. It is, thus, necessary to amplify the output of the magnetic sensor. In a case where the output of the magnetic sensor is amplified using an analog amplifier, the amplifier produces an output which varies in level across a reference level cyclically. The output of typical analog amplifiers, however, usually includes an error called an offset which is sensitive to a change in ambient temperature. This may cause the reference level used in the amplifier to be changed by the offset upon a change in environmental condition of use, thus leading to an error in determining the time when the magnetic passes through the center of the swing path.

Further, in a case where the above type of optical scanner is employed in a laser radar for automotive vehicles, the optical scanner is inclined when the vehicle travels on a slope, which may result in a shift of the center of the swing path of the oscillating member. This will cause the amplitude of movement of the oscillating member of the scanner to be changed greatly, thus resulting in an undesirable change in scanned area. Keeping the amplitude of movement of the oscillating member constant requires use of an amplitude sensor, which will result in an unwanted increase in size of the optical scanner.

SUMMARY OF THE INVENTION

It is therefore a principal object of the invention to avoid the disadvantages of the prior art.

It is another object of the invention to provide a position determining system capable of determining the position of a reciprocating member such as a reflective mirror of a scanner accurately regardless of a change in environmental condition of use.

It is a still object of the invention to provide a simplified structure of an amplitude monitoring system capable of determining an amplitude of movement of a reciprocating member accurately.

According to one aspect of the invention, there is provided an apparatus designed to determine a position of a reciprocating object such as a scanner mirror of an optical scanner. The apparatus comprises: (a) a sensor opposed to a path along which the object reciprocates, the sensor producing a first signal which varies in level as a function of a distance to the object and is reversed in sign when the object passes the sensor in either of approaching and leaving directions; (b) a signal converting circuit having a first input to which a threshold level that corresponds to a level of the first signal as produced when the object is closest to the sensor is inputted and a second input to which the first signal outputted from the sensor is inputted, the signal converting circuit working to convert the first signal into a second signal that varies in level cyclically across a reference signal level as a function of a difference between a level of the first signal and the threshold level; (c) a comparing circuit comparing a level of the second signal produced by the signal converting circuit with a given reference level to provide a signal indicative thereof; (d) a position signal producing circuit responsive to the signal from the comparing circuit to produce a position signal indicative of the position of the object based on a difference between the second signal and the given reference level; and (e) a reference level updating circuit working to update the given reference level by inputting signals equal in level to each other to the first and second inputs of the signal converting circuit and defining an output of the signal converting circuit as the given reference level. The updating serves to compensate for an error added in the signal converting circuit to the second signal, thereby resulting in an increased accuracy of comparison between the level of the second signal and the reference level.

In the preferred mode of the invention, the reference level updating circuit may be operated in response to a signal inputted from an external.

The reference level updating circuit may be operated cyclically in response to the position signal outputted from the position signal producing circuit.

The object is installed on a movable member of a scanner working to sweep a laser beam.

The object produces a magnetic field. The sensor outputs as the first signal an electric signal which varies in level as a function of a change in magnetic field intensity.

The sensor is opposed to a central portion of the path along which the object reciprocates. The position signal producing circuit produces the position signal indicative of passage of the object through the central portion of the path upon agreement of the level of the second signal with the reference level.

The apparatus may further comprise an initial level determining circuit which works to monitor the first signal for a given period of time to determine an average of a maximum and a minimum level of the first signal as an initial level of the given reference level.

The apparatus may further comprise a level shifting circuit working to shift one of the given reference level and the level of the first signal by a preselected level and an amplitude determining circuit determining a time ratio of a first period of time for which the level of the second signal is smaller than the given reference level to a second period of time for which the level of the second signal is greater than the given reference level to produce a signal indicative of an amplitude of movement of the object for use in controlling the movement of the object.

The reference level updating circuit may update the given reference level by short-circuiting the first and second inputs of the signal converting circuit and defines the output of the signal converting circuit as the given reference level.

The sensor may be opposed to a given location defined on the path along which the object reciprocates. The position signal producing circuit may produce the position signal indicative of passage of the object through the given location when the level of the second signal agrees with the given reference level.

According to the second aspect of the invention, there is provided an apparatus designed to control movement of a reciprocating object which comprises: (a) a sensor opposed to a path along which the object reciprocates, the sensor producing a first signal which varies in level as a function of a distance to the object and is reversed in sign when the object passes the sensor in either of approaching and leaving directions; (b) a signal converting circuit having a first input to which a threshold level that corresponds to a level of the first signal as produced when the object is closest to the sensor is inputted and a second input to which the first signal outputted from the sensor is inputted, the signal converting circuit working to convert the first signal into a second signal that varies in level cyclically across a reference signal level as a function of a difference between a level of the first signal and the threshold level; (c) a comparing circuit comparing a level of the second signal produced by the signal converting circuit with a signal level derived by shifting the reference signal level by a preselected level to provide a signal indicative thereof; and (d) an amplitude determining circuit responsive to the signal from the comparing circuit to determine a time ratio of a first period of time for which the level of the second signal is greater than the signal level to a second period of time for which the level of the second signal is smaller than the signal level to produce a signal indicative of an amplitude of movement of the object for use in controlling the movement of the object.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings.

DESCRIPTION OF THE PREFERRED EMBODIMENTS

Figure 1:
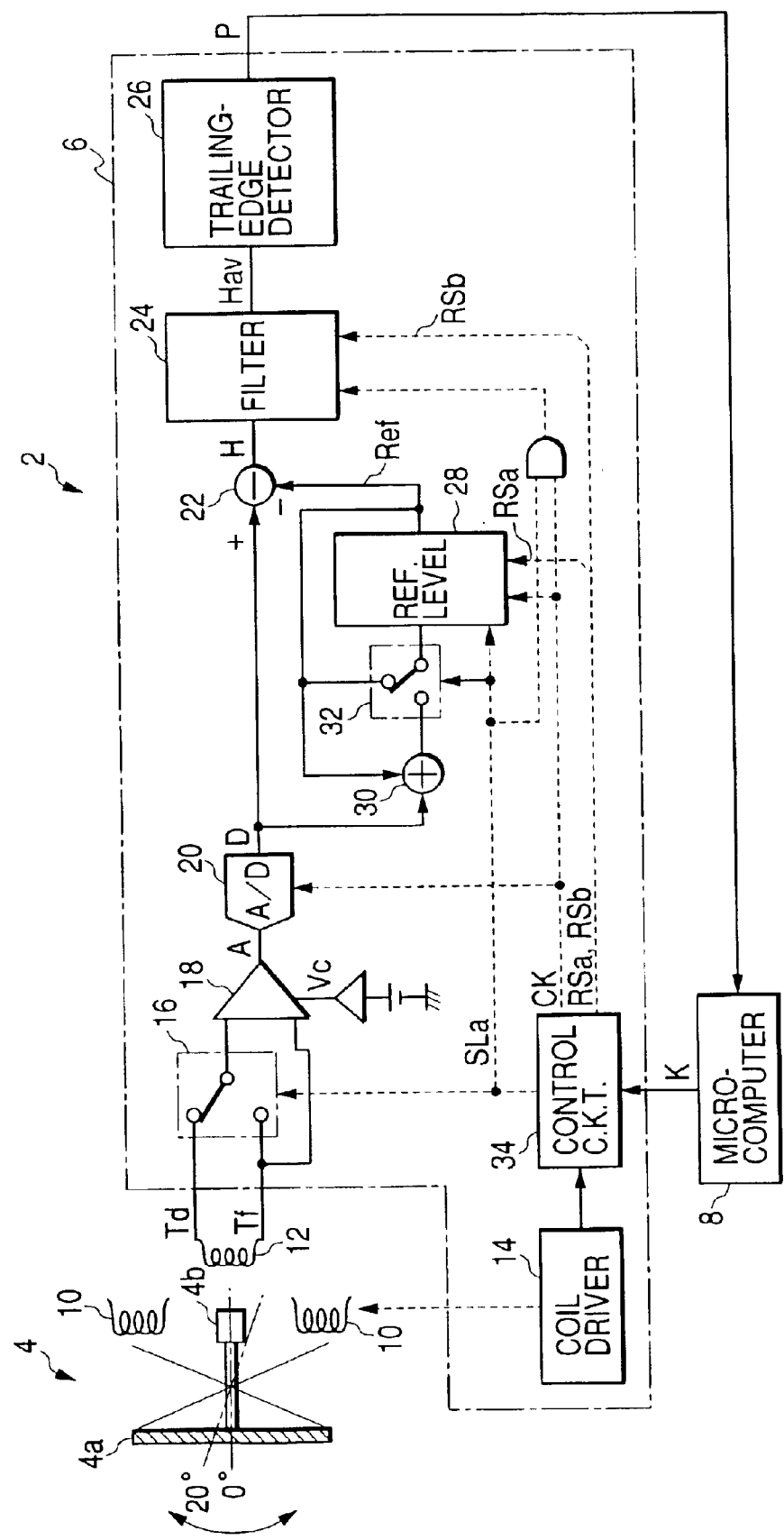
FIG. 1 is a circuit diagram which shows an internal structure of an optical scanner according to the first embodiment of the invention.

Referring to the drawings, wherein like reference numbers refer to like parts in several views, particularly to FIG. 1, there is shown an optical scanner 2 according to the first embodiment of the invention which may be employed in barcode readers, laser printers, or laser radars.

The optical scanner 2 consists essentially of a mirror support 4, a scanner controller 6, and a microcomputer 8. The mirror support 4 bears a reflective mirror 4a and swings it in directions, as indicated by arrows, to direct a laser beam over a given scan area. The scanner controller 6 monitors an angular direction or a scan angle of the mirror support 4 and produces a reference position signal P when the mirror support 4 is oriented to a reference direction in which the scan angle θ of the mirror support 4 is 0° at which the mirror 4a is at rest in this embodiment. The microcomputer 8 uses the reference position signal P to determine a period of time during which the scan angle θ lies within a given range of, for example, −20° to +20° and energizes a laser emitting element (not shown) to emit a laser beam to the reflective mirror 4a for the determine period of time. The microcomputer 8 also works to output to the scanner controller 6 an updating signal K for updating a reference level, as will be discussed later in detail, each time the reference position signal P is inputted m times (m=2 in this embodiment).

The mirror support 4 has attached thereto a permanent magnet 4b which swings along with the mirror support 4. Driver coils 10 are disposed on both sides of a path of swing of the permanent magnet 4b. A sensor coil 12 working as a magnetic sensor is placed and opposed to the center (i.e., a reference position) of the path of swing of the permanent magnet 4b.

The scanner controller 6 includes a coil driver 14 for controlling energization of the driver coils 10. The coil driver 14 supplies current to the driver coils 10 to produce an alternating field which works to attract and repulse the permanent magnet 10 alternately, thereby moving the permanent magnet 10 along the given path of swing to oscillate the mirror support 4 at its resonance frequency of, for example, 30 Hz.

The movement of the permanent magnet 4b along the path of swing will cause a magnetic field strength near the sensor coil 12 to change. The magnetic field strength near the sensor coil 12 is maximized when the permanent magnet 4b is in the reference position (i.e., the scan angle $\theta=0°$), while it is minimized when the permanent magnet 4b is at ends of the path of swing. The sensor coil 12 produces an electromotive force as a function of the magnetic field strength.

Figure 4:
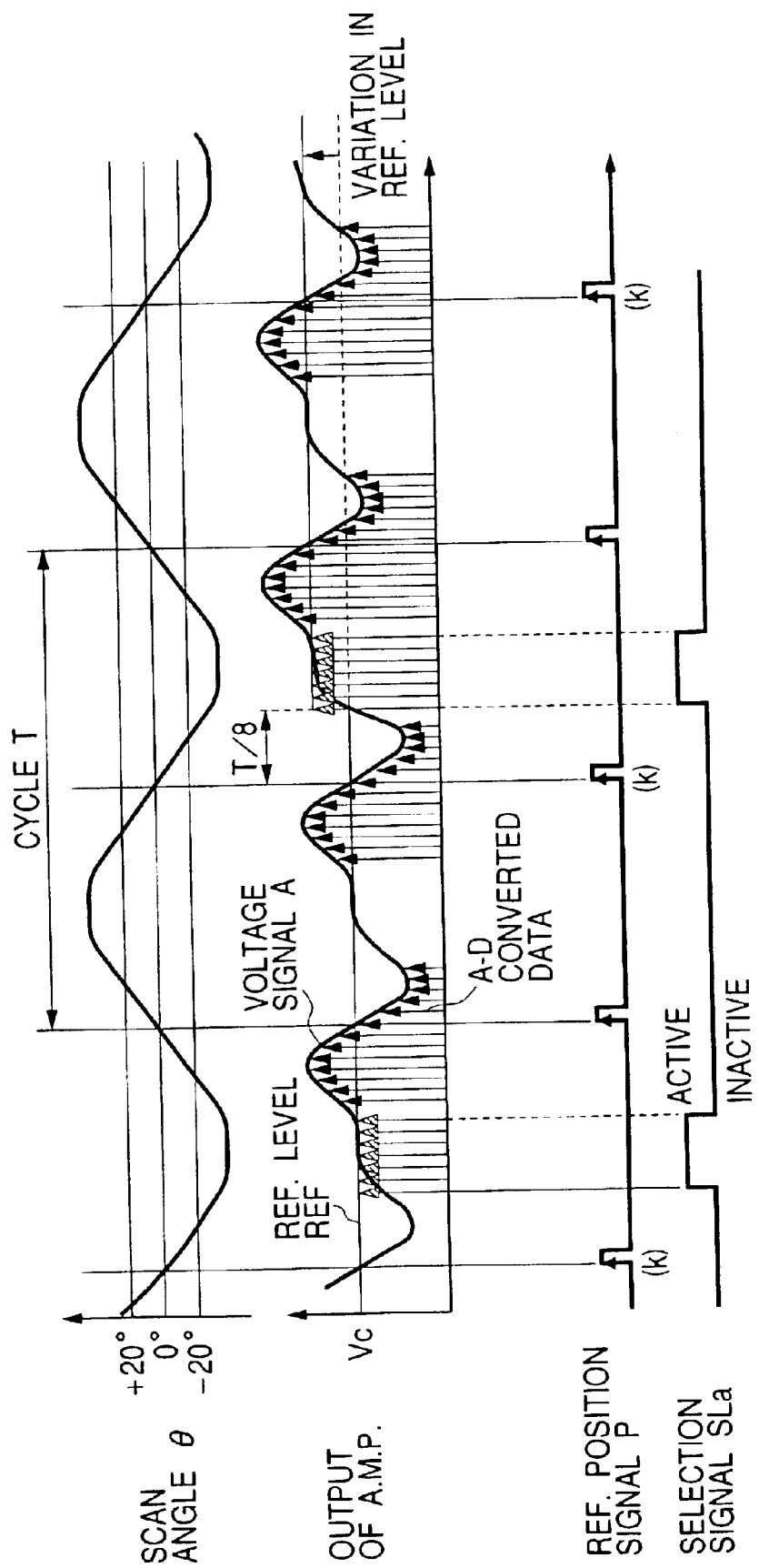
FIG. 4 is a time chart which shows a relation among a scan angle of a mirror support, an output of an amplifier, a reference position signal, and a selection signal.

The sensor coil 12 has a reference end Tf and a detection end Td. An electric potential or potential difference between the detection end Td and the reference end Tf becomes zero (0) when the magnetic field strength near the sensor coil 12 is maximized and minimized, that is, when the permanent magnet 4b passes the reference position and the ends of the path of swing. The polarity of the electric potential when the permanent magnet 4b is approaching the reference position and the ends of the path of swing is reversed to that when the permanent magnet 4b is moving away from them. Therefore, the sensor coil 12, as clearly shown in FIG. 4, produces the electromotive force whose waveform varies in a cycle that is half a cycle of the swing of the mirror support 4.

The scanner controller 6 also includes a selector switch 16, an amplifier 18, an A/D converter 20, a digital comparator 22, a digital filter 24, and a trailing-edge detector 26. The selector switch 16 is responsive to a selection signal Sla to select one of the reference end Tf and the detection end Td of the sensor coil 12. The amplifier 18 is coupled at input terminals thereof to the reference end Tf and the detection end Td of the sensor coil 12 through the selector switch 16 and amplifies a potential difference therebetween to produce a voltage signal A which varies in voltage level across a reference voltage Vc. The A/D converter 20 converts the voltage signal A into a voltage signal D in a digital form. The digital comparator 22 produces a comparison data H which shows +1 level when the value derived by subtracting the reference level Ref from the voltage signal D is positive and −1 level when it is negative. The digital filter 24 determines a moving average Hav of the m consecutive comparison data H (m=8 in this embodiment) produced by the digital comparator 22 and produces a signal indicative thereof. The trailing-edge detector 26 monitors a change in value of the moving average Hav and outputs the reference position signal P. Specifically, when the trailing-edge detector 26 detects a trailing edge of the signal outputted from the digital filter 24 which is produced each time the moving average Hav changes in value from positive to negative, the trailing-edge detector 26 produces the reference position signal P. The voltage signal A increases above the reference voltage Vc when the permanent magnet 4b is approaching the reference position and decreases below the reference voltage Vc when it is moving away from the reference position.

The scanner controller 6 also includes a reference level holding circuit 28, an adder 30, a switch 32, and a control circuit 34. The reference level holding circuit 28 stores therein the reference level Ref. The adder 30 adds the reference level Ref read out of the reference level holding circuit 28 to the voltage signal D. The switch 32 is actuated in response to a selection signal SLa inputted from the control circuit 34 and inputs either of the reference level Ref read out of the reference level holding circuit 28 and an output of the adder 30 to the reference level holding circuit 28. The control circuit 34 is responsive to the updating signal K outputted from the microcomputer 8 to produce the selection signals Sla, operating clocks CK, and reset signals RSa and RSb to control operations of the switches 16 and 32, the A/D converter 20, the digital filter 24, and the reference level holding circuit 28.

The switch 16 is responsive to the selection signal SLa of an inactive level to establish connection between the detection end Td of the sensor coil 12 and the amplifier 18, while it is responsive to the selection signal SLa of an active level to establish connection between the reference end Tf and the amplifier 18. The switch 32 is responsive to the selection signal SLa of the inactive level to establish connection between the output and input of the reference level holding circuit 28, while it is responsive to the selection signal SLa of the active level to establish connection between the input of the reference level holding circuit 28 and the output of the adder 30.

The A/D converter 20, the digital filter 24, and the reference level holding circuit 28 are designed to operate at the operating clocks CK (e.g., 100 kHz) produced by the control circuit 34. The reference level holding circuit 28 and the digital filter 24 are designed to reset data stored therein in response to the reset signals RSa and RSb, respectively. Note that when the selection signal SLa is at the active level, the control circuit 34 stops supplying the operating clocks CK to the digital filter 24.

Specifically, when the selection signal SLa is at the active level, the switch 16 short-circuits the inputs of the amplifier 18, so that the level of the voltage signal A or voltage signal D will be the sum of an offset of the amplifier 18 and the reference voltage Vc. The voltage signal D is totalized through the adder 30 and the switch 32 and stored in the reference level holding circuit 28.

The reference level holding circuit 28 is designed to shift a value stored therein by three bits to the least significant bit (LSB) thereof upon a change in selection signal SLa from the active to the inactive level. Therefore, when the eight voltage signals D are supplied to the reference level holding circuit 28 during the active level of the selection signal SLa, a value derived by dividing the total of the eight voltage signals D by eight, that is, an average thereof is stored in the reference level holding circuit 28 to update the reference level Ref.

Alternatively, when the selection signal SLa is in the inactive level, the electric potential appearing at the detection end Td of the sensor coil 12 is supplied to the amplifier 18 through the switch 16, so that the level of the voltage signal A or voltage signal D will be a level of voltage developed across the reference end Tf and the detection end Td of the sensor coil 12. The reference voltage Vc read out of the reference level holding circuit 28 is stored again therein through the switch 16. Therefore, the reference voltage Vc stored in the reference level holding circuit 28 immediately before the selection signal SLa is switched from the active level to the inactive level continues to be read out of the reference level holding circuit 28. The digital filter 24 is supplied with the operating clocks CK, thus enabling the scanner controller 6 to produce the reference position signal P based on the voltage signal D and the reference level Ref.

Figure 2:
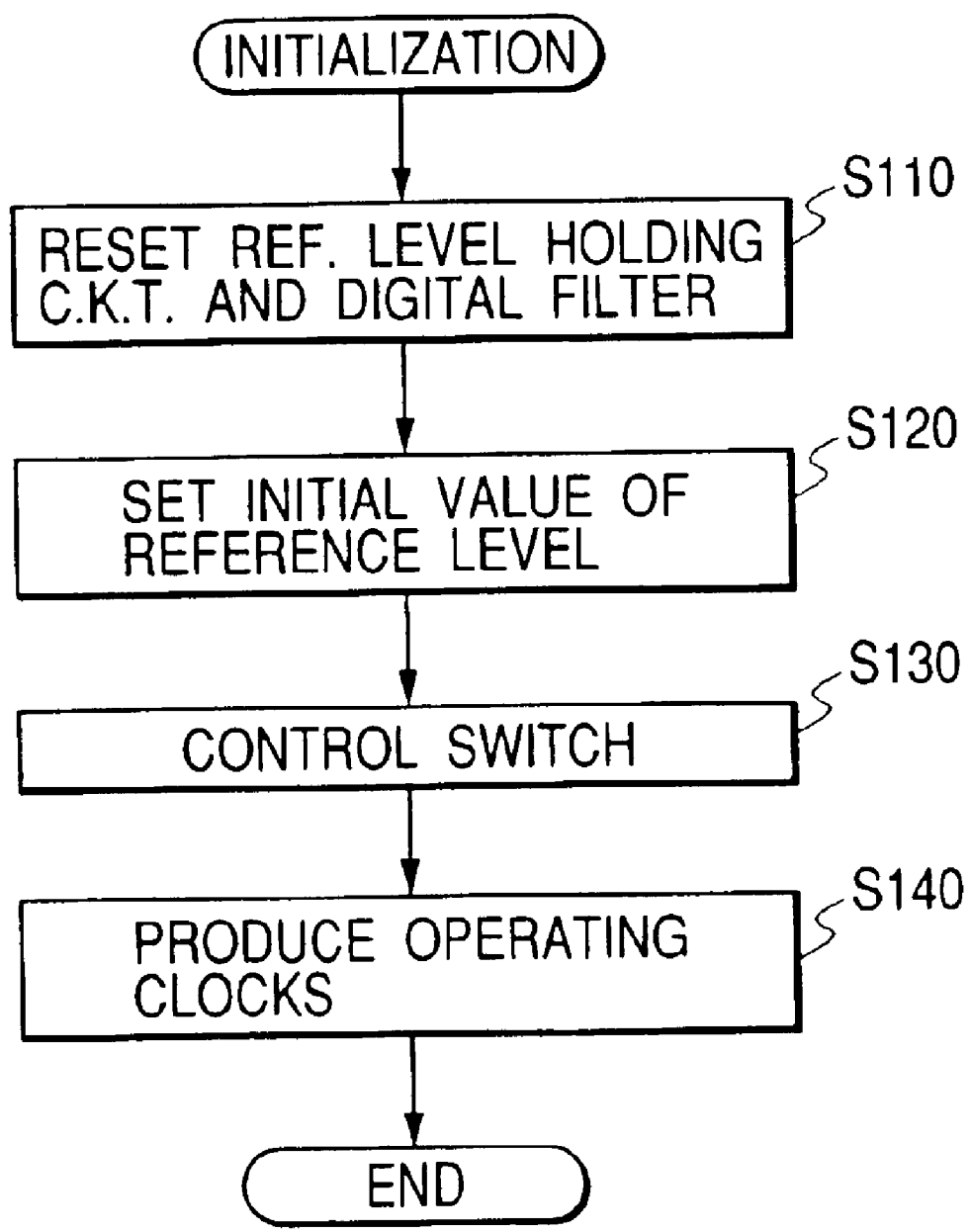
FIG. 2 is a flowchart of an initializing program performed upon turning on of the optical scanner of FIG. 1.
Figure 3:
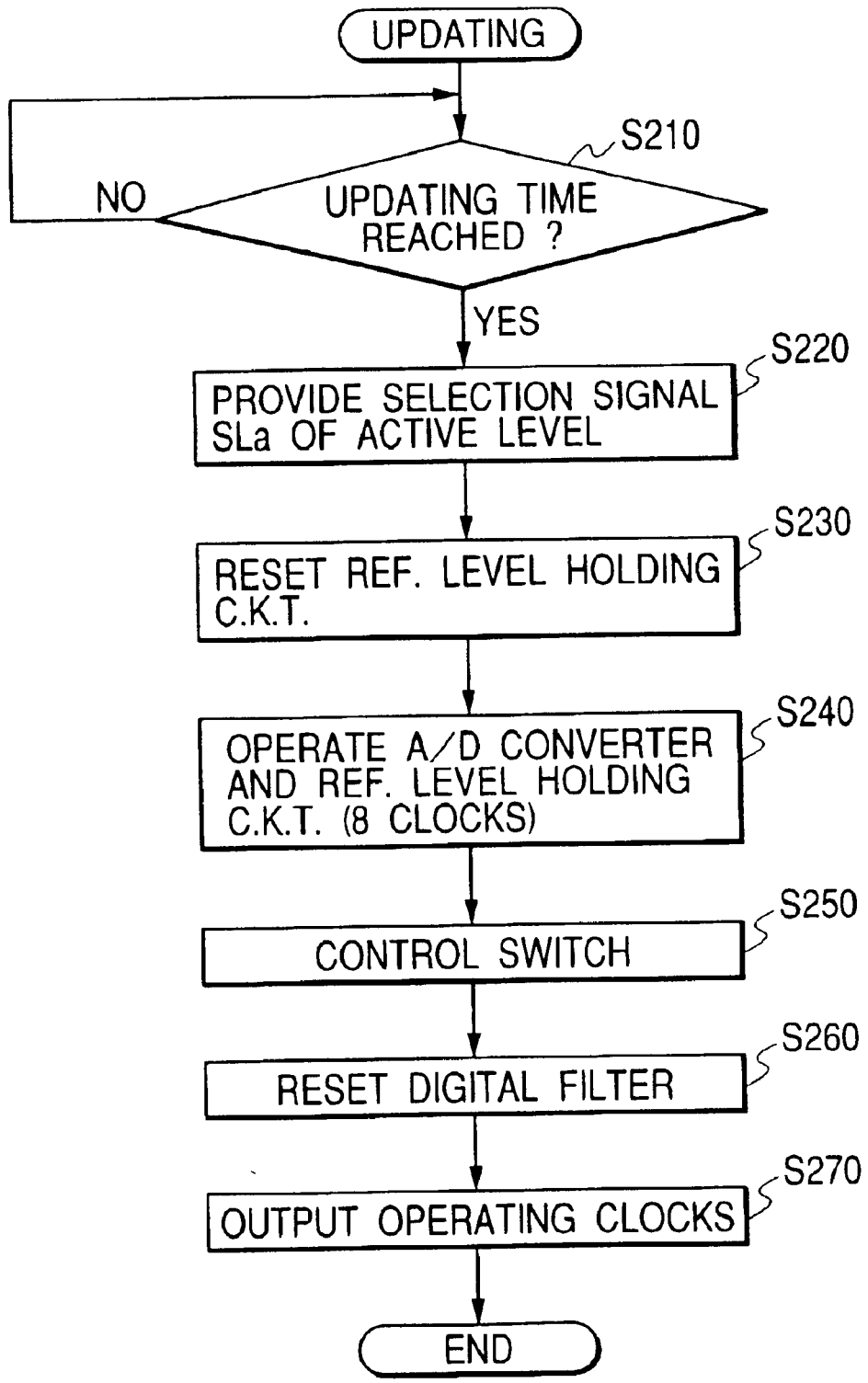
FIG. 3 is a flowchart of an updating program performed to update or correct a reference level used in determining a reference position of a mirror support of the optical scanner of FIG. 1.

FIGS. 2 and 3 show programs or sequences of logical steps performed in the optical scanner 2. The program of FIG. 2 is an initialization program executed one time upon turning on of the optical scanner 2. The program of FIG. 3 is an updating program executed in response to each input of the updating signal K from the microcomputer 8.

After entering the program of FIG. 2, the routine proceeds to step 110 wherein the coil driver 14 starts to energize the driver coils 10, and an initializing operation is carried out to output the reset signals RSa and RSb to reset the reference level holding circuit 28 and the digital filter 24.

The routine proceeds to step 120 wherein an initial value is set to the reference level Ref in the reference level holding circuit 28 through a data loading circuit (not shown).

The routine proceeds to step 130 wherein the selection signal SLa of the inactive level is provided for producing the reference position signal P. The routine proceeds to step 140 wherein the operating clocks CK are produced to initiate the operations of the A/D converter 20, the reference level holding circuit 28, and the digital filter 24 and terminates.

Subsequently, the scanner controller 6 outputs the reference position signal P each time the output Hav of the digital filter 24 is reversed from positive to negative, that is, the scan angle θ of the mirror support 4 becomes 0°. The microcomputer 8 outputs the updating signal K to the scanner controller 6 each time it detects the reference position signal P two times. The control circuit 34 of the scanner controller 6 is responsive to the updating signal K to stop outputting the operating clocks CK and initiates the updating program of FIG. 3.

After entering the program of FIG. 3, the routine proceeds to step 210 wherein it is determined whether a given time when the reference level Ref should be updated has been reached or not. If a YES answer is obtained, then the routine proceeds to step 220 wherein the selection signal SLa is switched to the active level for updating the reference level Ref. Specifically, the control circuit 34 establishes the connection between the inputs of the amplifier 18 to output through the amplifier 18 the voltage signal A that is the sum of the reference voltage Vc and the offset of the amplifier 18. The routine proceeds to step 230 wherein the value stored in the reference level holding circuit 28 is reset.

It is advisable that the time when the reference level Ref is to be updated should not overlap with a period of time for which a laser beam is outputted to the mirror 4a. In this embodiment, it is, as clearly shown in FIG. 4, set to the cycle T of oscillation or swing of the mirror support 4 over eight (8) (i.e., T/8) after input of the updating signal K is inputted to the control circuit 34.

After step 230, the routine proceeds to step 240 wherein the control circuit 34 outputs the eight operating clocks CK in sequence to activate the A/D converter 20 and the reference level holding circuit 28. The routine proceeds to step 250 wherein the control circuit 34 changes the selection signal SLa to the inactive level for producing the reference position signal P. This causes an average of levels Vc of the eight consecutive voltage signals A, that is, an average of the eight consecutive voltage signals D to be calculated and stored as the reference level Ref in the reference level holding circuit 28.

The routine proceeds to step 260 wherein the control circuit 34 outputs the reset signal RSb to reset the digital filter 24. The routine proceeds to step 270 wherein the control circuit 34 produces the operating clocks CK to start the operations of the A/D converter 20, the reference level holding circuit 28, and the digital filter 24 and then terminates.

Subsequently, the scanner controller 6 outputs the reference position signal P each time the output Hav of the digital filter 24 is reversed from positive to negative, that is, the scan angle θ of the mirror support 4 becomes 0°. The microcomputer 8 outputs the updating signal K to the scanner controller 6 each time it detects the reference position signal P two times. The control circuit 34 of the scanner controller 6 is responsive to the updating signal K to stop outputting the operating clocks CK and resume the updating program of FIG. 3.

As apparent from the above discussion, the optical scanner 2 works to update the reference level Ref used in the digital comparator 22 for determining the angular position of the mirror support 4 (i.e., the mirror 4a) by short-circuiting the inputs of the amplifier 18 to provide the sum of the reference voltage Vc and the offset of the amplifier 18 to correct the reference level Ref. This compensates for an error in determining the reference position of the mirror support 4 (i.e., the scan angle θ=0°) caused by the offset inevitably included in the output of the amplifier 18. Specifically, the reference level Ref matches up with the level of the voltage signal A produced when the scan angle θ of the mirror support 4 becomes 0°, thereby enabling the reference position signal P to be provided accurately. This results in an increase in accuracy of controlling a scan angle of a laser beam outputted from the optical scanner 2.

The optical scanner 2 is, as described above, designed to produce the updating signal K each time the reference position signal P is outputted from the scanner controller 6 two times, that is, in each cycle T of oscillation or swing of the mirror support 4, thereby correcting the reference level Ref cyclically automatically. Therefore, even if characteristics of the amplifier 18 (i.e., the offset) has changed with time or by a variation in environmental condition of use, the reference level Ref is kept at a correct value at all times.

The optical scanner 2 is also designed to determine the time when the reference position signal P is to be produced using the moving average Hav of the comparison data H, thereby eliminating electric noises added to the voltage signal A to increase the accuracy of determining the reference position signal P further.

Figure 5:
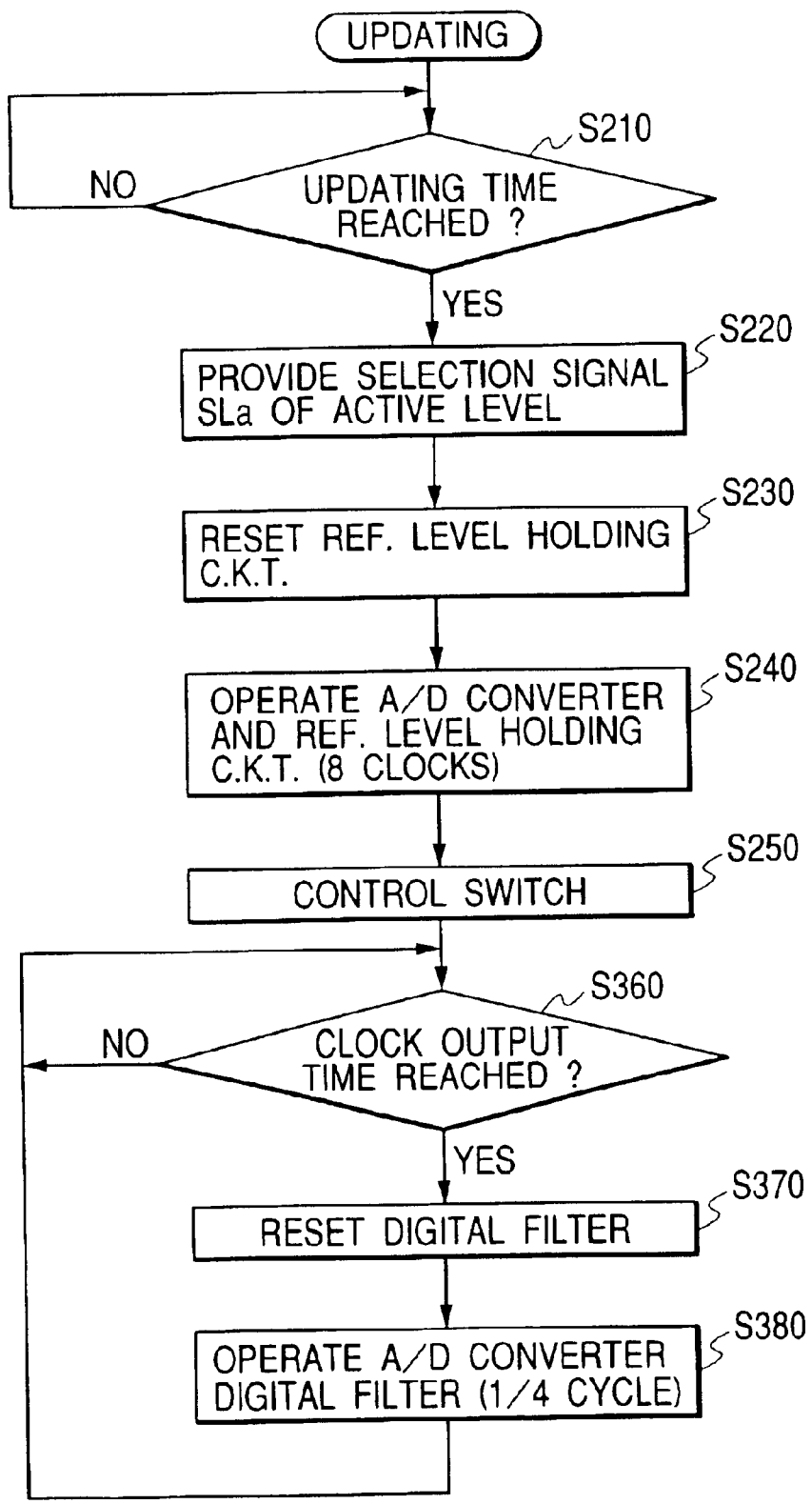
FIG. 5 is a flowchart of a modification of the updating program of FIG. 3.

The control circuit 34 is, as described above, designed to continue outputting the operating clocks CK (step 260) after the reference level Ref is updated (steps 210 to 250), but however, a program, as shown in FIG. 5, may be carried out in place of the one shown in FIG. 3. Specifically, after the reference level Ref is updated, it is determined in step 360 whether a clock output time when the operating clocks CK are to be outputted has been reached or not. If the clock output time has been reached, the control circuit 34 outputs in step 370 the reset signal RSb to reset the digital filter 24 and produces in step 380 the operating clocks CK for a given period of time. After step 380, the routine returns back to step 360.

The length of time for which the operating clocks CK are to be outputted needs to include the time when the scan angle θ becomes 0°. For instance, the clock output time is set after the lapse of $3T/8+kT(k=0, 1, 2, \ldots)$ from when the updating signal K is inputted to the control circuit 34. The clock output time is set to T/4. In this case, only a required number of operating clocks CK are outputted, thus resulting in a great decrease in electric power consumed in the scanner controller 6.

The optical scanner 2, as described above, updates or corrects the reference level Ref each time the reference position signal P is outputted from the scanner controller 6 two times following output of the updating signal K from the microcomputer 8, however, such updating may be performed every output of the reference position signal P or every given number (i.e., more than two) of consecutive outputs thereof. The cycle of the updating is preferably short for the purpose of eliminating unwanted electric noises, whereas it may be prolonged only for the purpose of compensating for an error in determining the reference level Ref arising from variations in characteristics of the amplifier 18 with time and/or due to a change in ambient temperature.

The control circuit 34 initiates the updating program of FIG. 3 in response to input of the updating signal K from the microcomputer 8, but may alternatively use an input of the reference position signal P as a trigger to initiate the updating program. This results in a decrease in operation load of the microcomputer 8.

Figure 6:
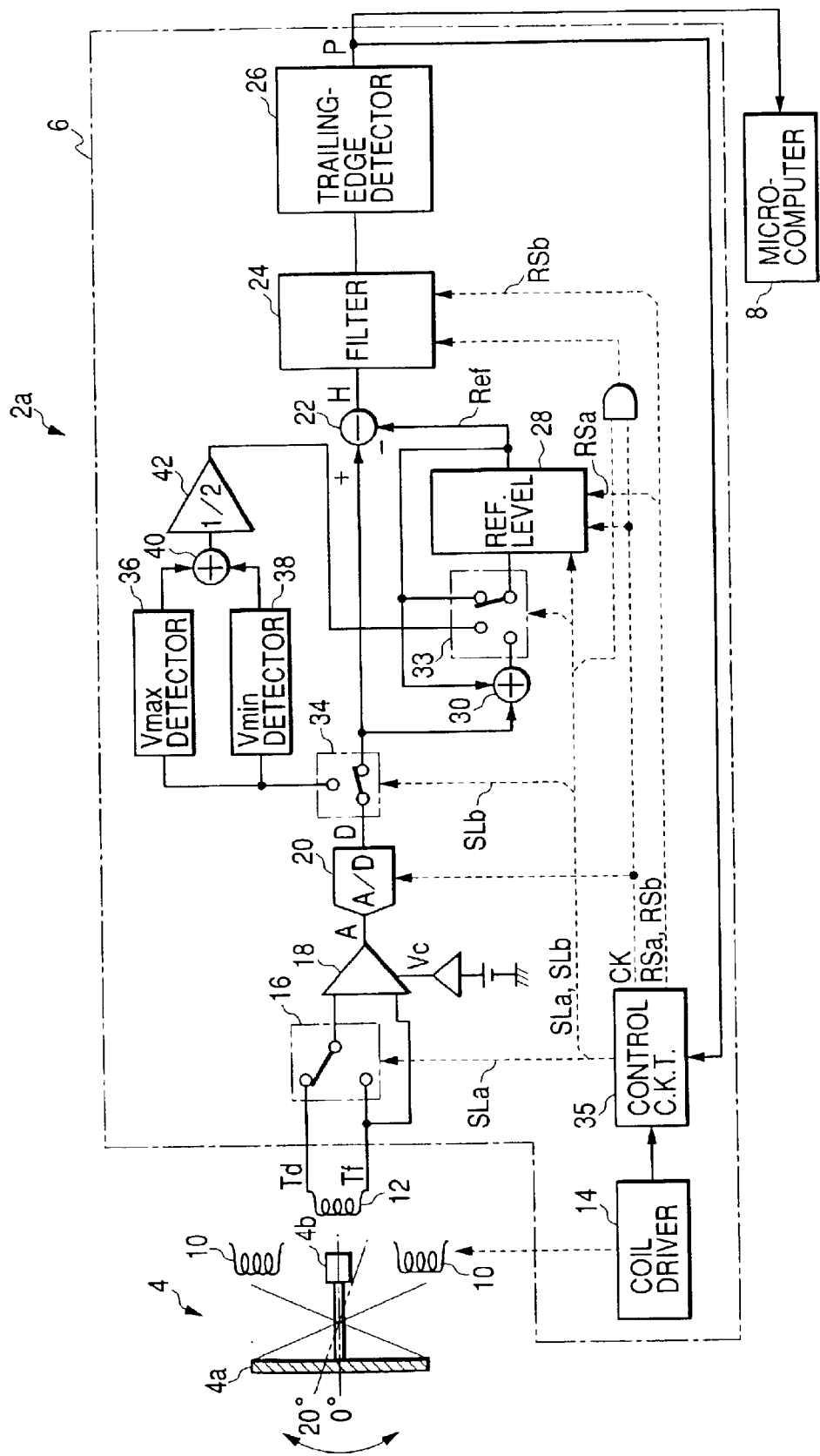
FIG. 6 is a circuit diagram which shows an internal structure of an optical scanner according to the second embodiment of the invention.

FIG. 6 shows an optical scanner 2a according to the second embodiment of the invention.

The optical scanner 2a includes a maximum detector 36, a minimum detector 38, an adder 40, a divider 42, and a switch 34 in addition to the component parts of the one shown in FIG. 1. The maximum detector 36 determines a maximum value Vmax of the voltage signal D outputted from the A/D converter 20. The minimum detector 38 determines a minimum value Vmin of the voltage signal D. The adder 40 determines the sum of the the maximum value Vmax and the minimum value Vmi outputted from the maximum and minimum detectors 36 and 38. The divider 42 divides an output of the adder 40 by two to determine the average of the maximum value Vmax and the minimum value Vmi. The switch 34 is responsive to the selection signal SLb to selectively establish connections between the output of the A/D converter 20 and a line leading to the maximum and minimum detectors 36 and 38 and between the output of the A/D converter 20 and a line leading to the digital comparator 22 and the adder 30. The optical scanner 2a also includes a switch 33 in place of the switch 32 in FIG. 1. The switch 33 is responsive to the selection signals SLa and SLb to establish connections between the input of the reference level holding circuit 28 and the output of the adder 30 and between the input of the reference level holding circuit 28 and an output of the divider 42 selectively.

The maximum detector 36, the minimum detector 38, the adder 40, the divider 42, and the switches 33 and 34 function, as will be apparent hereinafter, as an initial reference level determining circuit.

The switch 34 is responsive to the selection signal SLb of the inactive level to supply the voltage signal D to the digital comparator 22, while it is responsive to the selection signal SLb of the active level to supply the voltage signal D to the maximum and minimum detectors 36 and 38.

The switch 33 is operable in three modes. In the first mode where the selection signals SLa and SLb are both at the inactive level, the switch 33 supplies the output of the reference level holding circuit 28 to the input of the reference level holding circuit 28. In the second mode where the selection signal SLa is at the active level, the switch 33 supplies the output of the adder 30 to the input of the reference level holding circuit 28. In the third mode where the selection signal SLb is at the active level, the switch 33 supplies the output of the divider 42 to the reference level holding circuit 28.

The digital filter 24 is prohibited from operating not only when the selection signal SLa is at the active level, but also when the selection signal SLb is at the active level.

The control circuit 35 does not provide the selection signals SLa and SLb both of which are at the active level. The scanner controller 6, thus, operates in the same manner as that in the first embodiment in response to the selection signal SLa when the selection signal SLb is at the inactive level.

When the selection signal SLb is at the active level, the average of the maximum value Vmax and the minimum value Vmin of the voltage signal D as measured while the selection signal SLb is at the active level is held as the reference level Ref in the reference level holding circuit 28.

The control circuit 35 performs an initializing operation one time following turning on of the optical scanner 2a and also performs an updating operation every output of the reference position signal P from the trailing-edge detector 26. The updating operation as executed in this embodiment is exactly the same as the one shown in FIG. 3 in the first embodiment, while the initializing operation is different from that in the first embodiment and will be discussed below with reference to FIG. 7.

Figure 7:
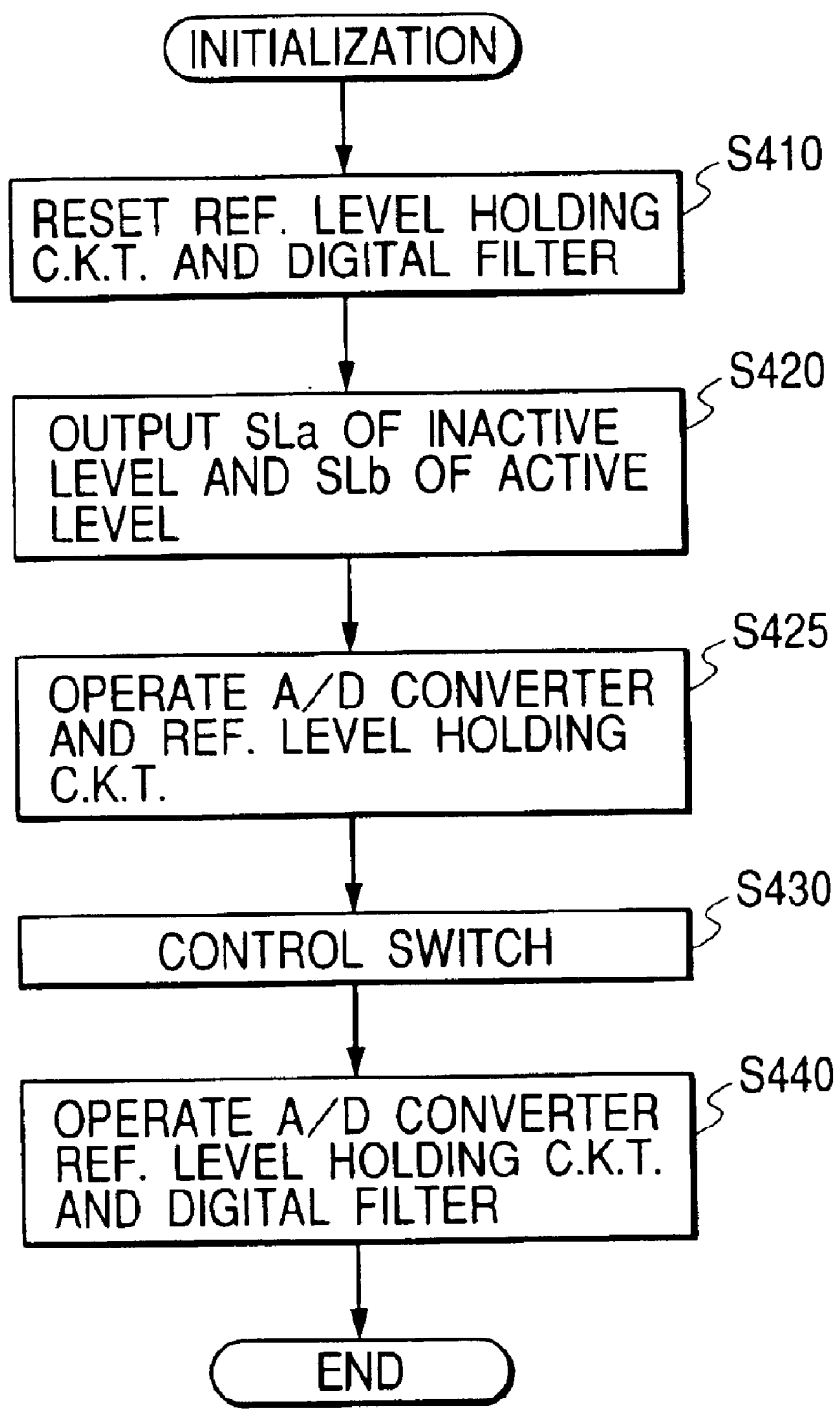
FIG. 7 is a flowchart of an initializing program performed upon turning on of the optical scanner of FIG. 6.

After entering an initialization program of FIG. 7, the routine proceeds to step 410 wherein the control circuit 35 outputs the reset signals RSa and RSb to reset the reference level holding circuit 28 and the digital filter 24.

The routine proceeds to step 420 wherein the control circuit 35 outputs the selection signal SLa of the inactive level and the selection signal SLb of the active level. The routine proceeds to step 425 wherein the control circuit 35 outputs the operating clocks CK for a period of time that is half the swing cycle T of the mirror support 4 (i.e., one cycle of the voltage signal A) to operate the A/D converter 20 and the reference level holding circuit 28.

The routine proceeds to step 430 wherein the control circuit 35 provides the selection signal SLa of the inactive level for producing the reference position signal P. The routine proceeds to step 440 wherein the control circuit 35 produces the operating clocks CK to initiate the operations of the A/D converter 20, the reference level holding circuit 28, and the digital filter 24 and terminates.

Figure 8:
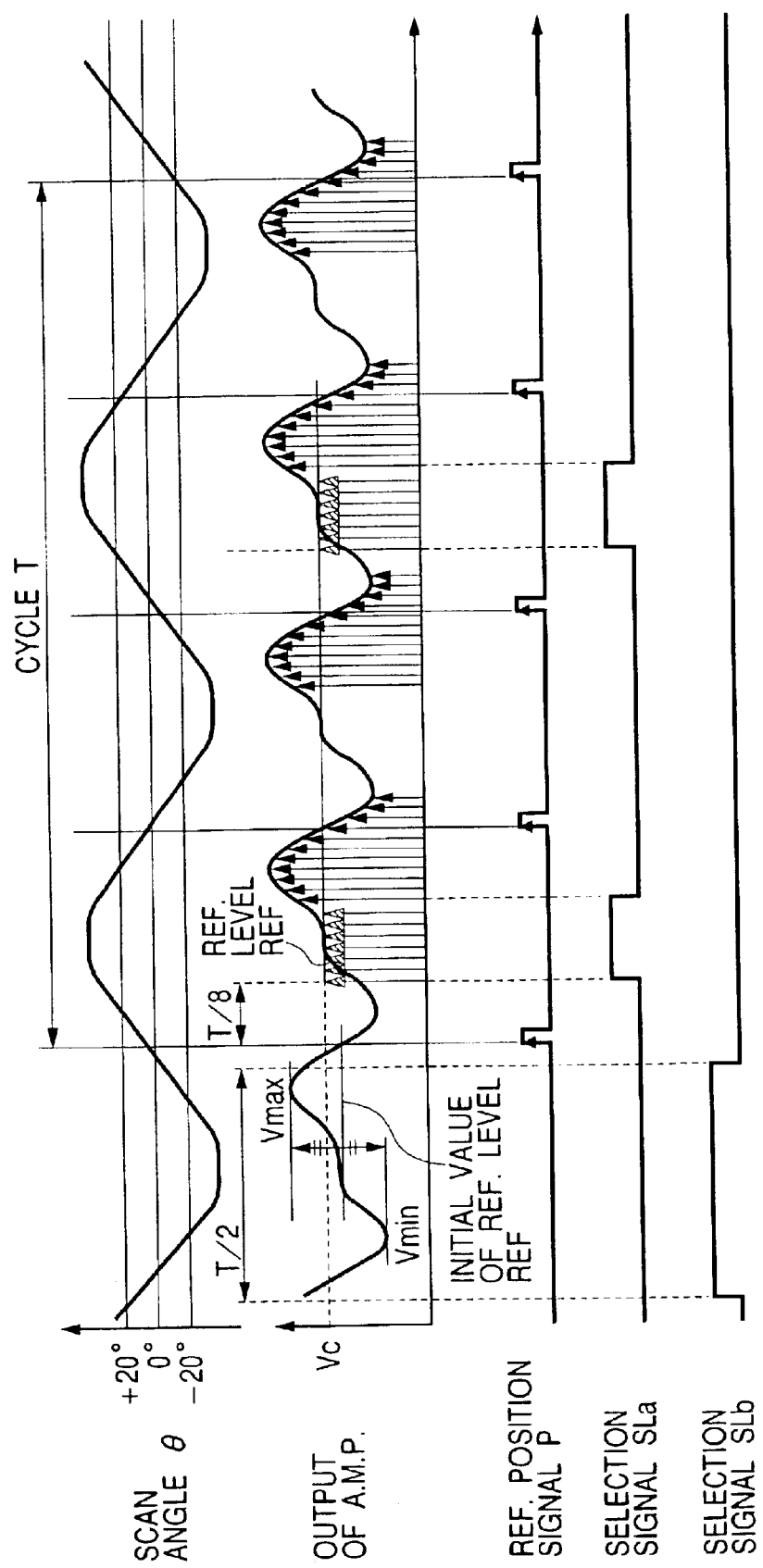
FIG. 8 is a time chart which shows a relation among a scan angle of a mirror support, an output of an amplifier, a reference position signal, and selection signals.

Specifically, immediately after the optical scanner 2a is turned on, a central level ({Vmax+Vmin}/2) of the voltage signal A is, as clearly shown in FIG. 8, provided as an initial value of the reference level Ref. Based on this value, the reference position signal P is produced through the digital comparator 22, the digital filter 24, and the trailing-edge detector 26. The control circuit 35 is responsive to the reference position signal P to initiate the updating program identical with that in the first embodiment for correcting the reference level Ref.

As apparent from the above discussion, the optical scanner 2a of this embodiment is designed to determine the central level of the voltage signal D (i.e., the average of the maximum value Vmax and the minimum value Vmin) for use in producing the initial value of the reference position signal P. This results in improved accuracy of the reference position signal P first produced.

The control circuit 35 of this embodiment initiates the updating program in response to input of the reference position signal P from the trailing-edge detector 26, but may alternatively use, like the first embodiment, an input of the updating signal K as a trigger to initiate the updating program.

Figure 9:
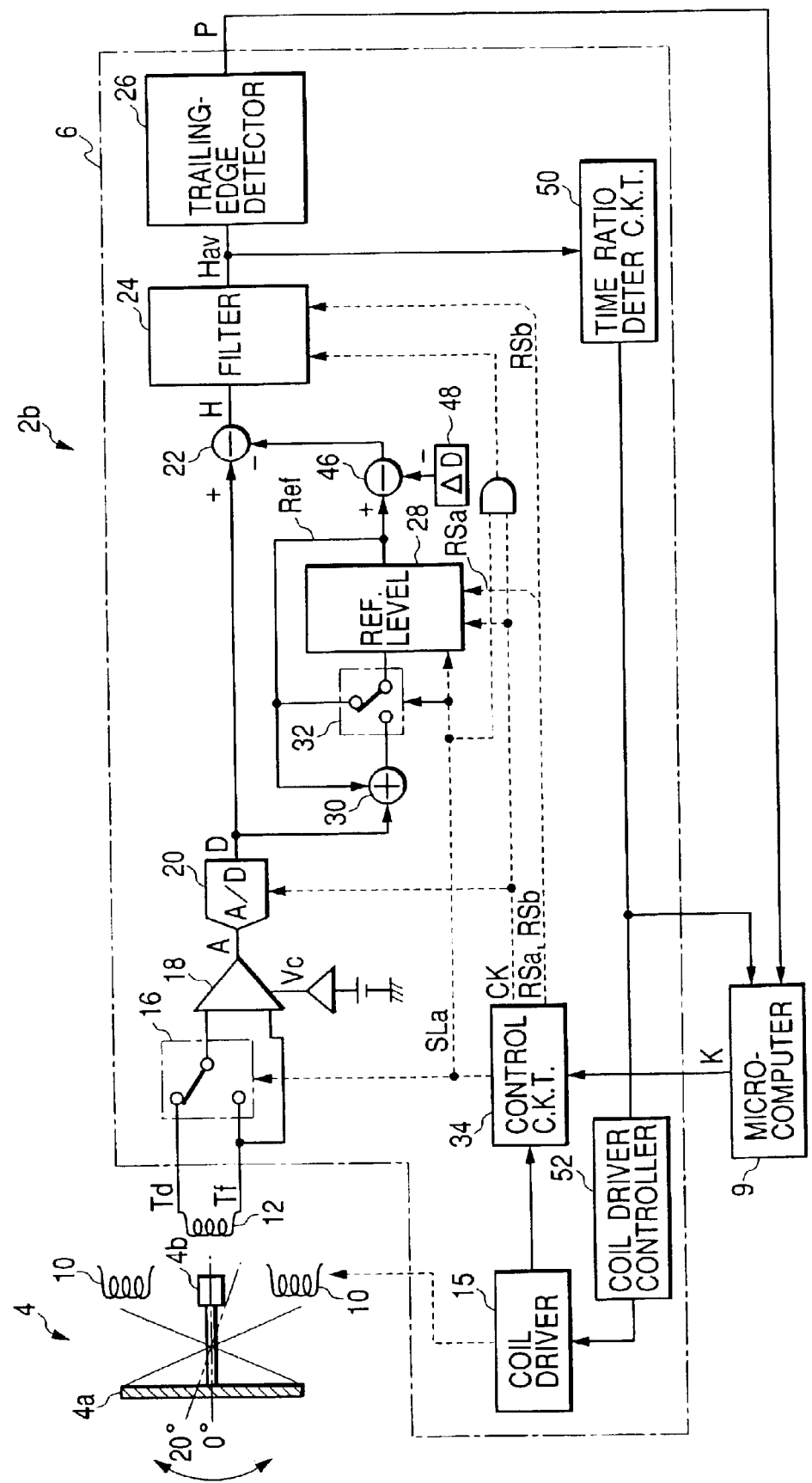
FIG. 9 is a circuit diagram which shows an internal structure of an optical scanner according to the third embodiment of the invention.

FIG. 9 shows an optical scanner 2b according to the third embodiment of the invention.

The optical scanner 2b includes a sifting level holding circuit 48, a subtractor 46, a time ratio determining circuit 50, and a coil driver controller 52.

The shifting level holding circuit 48 stores therein a shifting level ΔD. The subtractor 46 subtracts the shifting level ΔD stored in the shifting level holding circuit 48 from the reference level Ref read out of the reference level holding circuit 28 to provide a resulting value of Ref−ΔD to the digital comparator 22. The time ratio determining circuit 50 determines a time ratio RT of a first period of time T1 for which the output Hav of the digital filter 24 is negative to a second period of time T2 for which the output Hav of the digital filter 24 is positive (i.e., RT=T1/T2). The coil driver controller 52 compares the time ratio RT determined in the time ratio determining circuit 50 with a reference time ratio RTf as expected to be provided when the mirror support 4 swings or oscillates at a desired amplitude. When the time ratio RT is smaller than the reference time ratio RTf, the coil driver controller 50 outputs a command signal to the coil driver 15 to increase the amplitude of oscillation of the mirror support 4. Alternatively, when the time ratio RT is greater than the reference time ratio RTf, the coil driver controller 50 outputs a command signal to the coil driver 15 to decrease the amplitude of oscillation of the mirror support 4. This causes the amplitude of oscillation of the mirror support 4 to be kept constant.

The time ratio RT determined in the time ratio determining circuit 50 is also inputted to the microcomputer 9. The microcomputer 9 uses the time ratio RT to correct the reference position signal P produced by the trailing-edge detector 26 and outputs the updating signal K upon correction of the reference position signal P.

Figure 10:
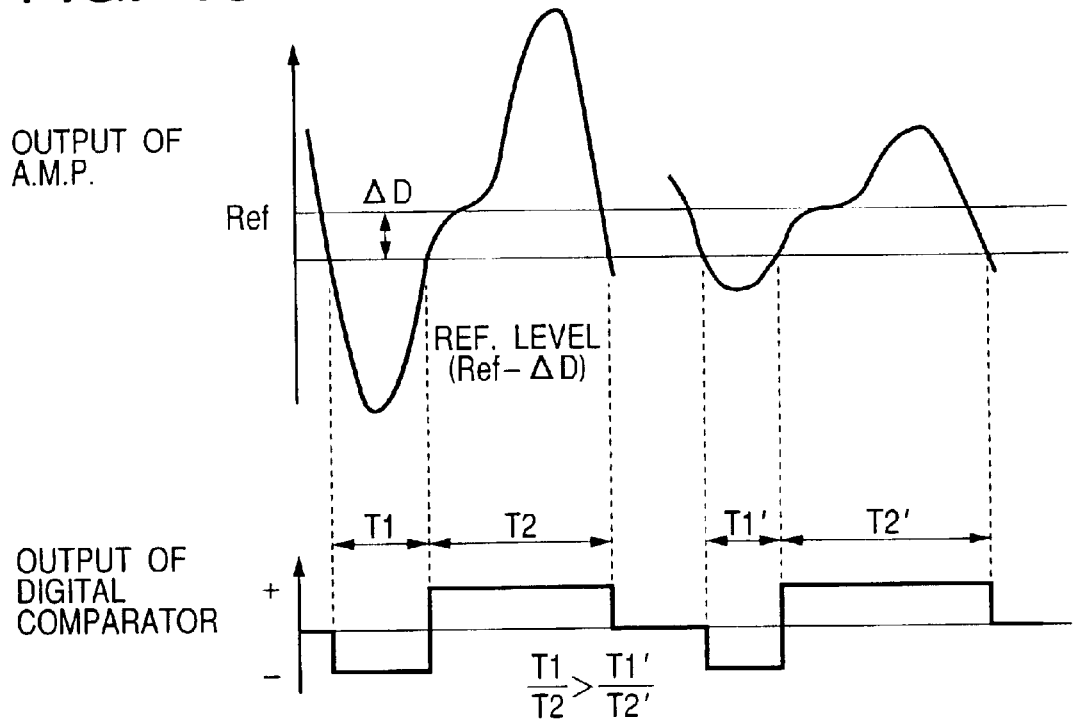
FIG. 10 is a chart which shows a change in time ratio of a first period of time for which an output of an amplifier is smaller than a reference level to a second period of time for which the output of the amplifier is greater than the reference level when the reference level is shifted.

When the reference level Ref is shifted by the shifting level ΔD through the subtractor 46, it will cause, as shown in FIG. 10, the time ratio RT to decrease as the amplitude of the voltage signal A decreases and to increase as the amplitude of the voltage signal A increases. It is, thus, possible to estimate a change in amplitude of the voltage signal A as a function of a change in time ratio RT.

The shifting of the reference level Ref will cause the time the reference position signal P is outputted to be shifted from when the permanent magnet 4b passes through the reference position (i.e., the scan angle θ=0°), however, such a time shift may be estimated based on the shifting level ΔD and the time ratio RT, thus allowing the microcomputer 9 to correct the time when the reference position signal P is to be outputted based on an estimate of the time shift.

As apparent from the above discussion, the optical scanner 2b of this embodiment works to monitor a change in amplitude of oscillation of the mirror support 4 and feeds it back to the coil driver 15 trough the coil driver controller 52 so that the amplitude of the oscillation of the mirror support 4 may be kept constant. This allows a range scanned by the optical scanner 2b to be maintained constant, thus resulting in stability of the performance of the optical scanner 2b regardless of a change in environmental condition of use.

The change in amplitude of oscillation of the mirror support 4 is determined based on the time ratio RT as calculated through the comparison of the reference level Ref shifted by the shifting level ΔD with the voltage signal D. Specifically, the structure of this embodiment enables the change in amplitude of oscillation of the mirror support 4 to be determined without use of an additional sensor other than the sensor coil 12 which will result in an unwanted increase in physical size of the optical scanner 2b.

The optical scanner 2b may achieve the same effects as described above by shifting the voltage signal D, the voltage signal A, or the reference voltage Vc without shifting the reference level Ref.

The structure of this embodiment may be used with the second embodiment as shown in FIG. 6.

The optical scanner 2b may alternatively omit a structure for determining the reference position signal P to construct a swing control system which only works to monitor the time ratio RT to adjust the amplitude of swing of the mirror support 4 to a desired one.

Figure 11:
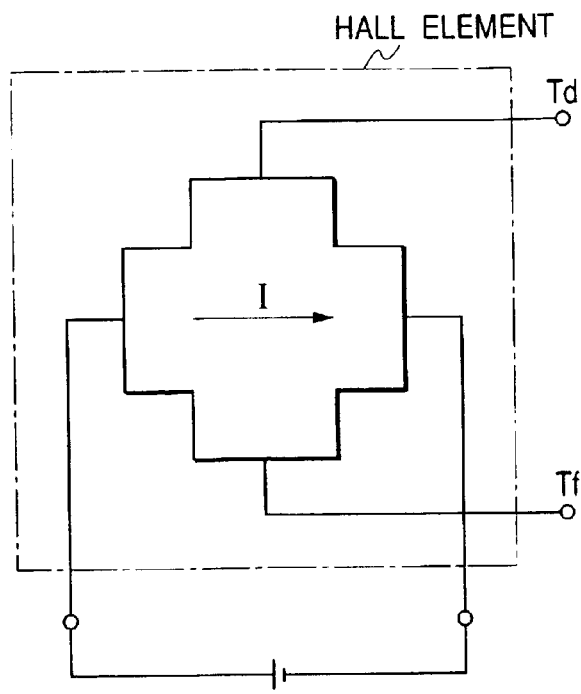
FIG. 11 is an illustration which shows a Hall element which may be used instead of a sensor coil.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments witch can be embodied without departing from the principle of the invention as set forth in the appended claims. For instance, in place of the sensor coil 12 monitoring the magnetic field produced by the permanent magnet 4b, a Hall element, as shown in FIG. 11, a magneto-resistive element, or other magnetic sensors may be connected to the switch 16.

What is claimed is:

1. An apparatus designed to determine a position of a reciprocating object comprising:

a sensor opposed to a path along which the object reciprocates, said sensor producing a first signal which varies in level as a function of a distance to the object and is reversed in sign when the object passes said sensor in either of approaching and leaving directions;

a signal converting circuit having a first input to which a threshold level that corresponds to a level of the first signal as produced when the object is closest to said sensor is inputted and a second input to which the first signal outputted from said sensor is inputted, said signal converting circuit working to convert the first signal into a second signal that varies in level cyclically across a reference signal level as a function of a difference between a level of the first signal and the threshold level;

a comparing circuit comparing a level of the second signal produced by said signal converting circuit with a given reference level to provide a signal indicative thereof;

a position signal producing circuit responsive to the signal from said comparing circuit to produce a position signal indicative of the position of the object based on a difference between the second signal and the given reference level; and a reference level updating circuit working to update the given reference level by inputting signals equal in level to each other to the first and second inputs of said signal converting circuit and defining an output of said signal converting circuit as the given reference level.

2. An apparatus as set forth in claim 1, wherein said reference level updating circuit operates in response to a signal inputted from an external.

3. An apparatus as set forth in claim 1, wherein said reference level updating circuit operates cyclically in response to the position signal outputted from said position signal producing circuit.

4. An apparatus as set forth in claim 1, wherein the object is installed on a movable member of a scanner working to sweep a laser beam.

5. An apparatus as set forth in claim 1, wherein the object produces a magnetic field, and wherein said sensor outputs as the first signal an electric signal which varies in level as a function of a change in magnetic field intensity.

6. An apparatus as set forth in claim 1, wherein said sensor is opposed to a central portion of the path along which the object reciprocates, and wherein the position signal producing circuit produces the position signal indicative of passage of the object through the central portion of the path upon agreement of the level of the second signal with the reference level.

7. An apparatus as set forth in claim 6, further comprising an initial level determining circuit which works to monitor the first signal for a given period of time to determine an average of a maximum and a minimum level of the first signal as an initial level of said given reference level.

8. An apparatus as set forth in claim 6, further comprising a level shifting circuit working to shift one of said given reference level and the level of the first signal by a preselected level and an amplitude determining circuit determining a time ratio of a first period of time for which the level of the second signal is smaller than said given reference level to a second period of time for which the level of the second signal is greater than the given reference level to produce a signal indicative of an amplitude of movement of the object for use in controlling the movement of the object.

9. An apparatus as set forth in claim 1, wherein said reference level updating circuit updates the given reference level by short-circuiting the first and second inputs of said signal converting circuit and defines the output of said signal converting circuit as the given reference level.

10. An apparatus as set forth in claim 1, wherein said sensor is opposed to a given location defined on the path along which the object reciprocates, and wherein said position signal producing circuit produces the position signal indicative of passage of the object through the given location when the level of the second signal agrees with the given reference level.

11. An apparatus designed to control movement of a reciprocating object comprising:

a sensor opposed to a path along which the object reciprocates, said sensor producing a first signal which varies in level as a function of a distance to the object and is reversed in sign when the object passes said sensor in either of approaching and leaving directions;

a signal converting circuit having a first input to which a threshold level that corresponds to a level of the first signal as produced when the object is closest to said sensor is inputted and a second input to which the first signal outputted from said sensor is inputted, said signal converting circuit working to convert the first signal into a second signal that varies in level cyclically across a reference signal level as a function of a difference between a level of the first signal and the threshold level;

a comparing circuit comparing a level of the second signal produced by said signal converting circuit with a signal level derived by shifting the reference signal level by a preselected level to provide a signal indicative thereof; and an amplitude determining circuit responsive to the signal from said comparing circuit to determine a time ratio of a first period of time for which the level of the second signal is greater than said signal level to a second period of time for which the level of the second signal is smaller than said signal level to produce a signal indicative of an amplitude of movement of the object for use in controlling the movement of the object.

* * * * *